Patented Apr. 3, 1934

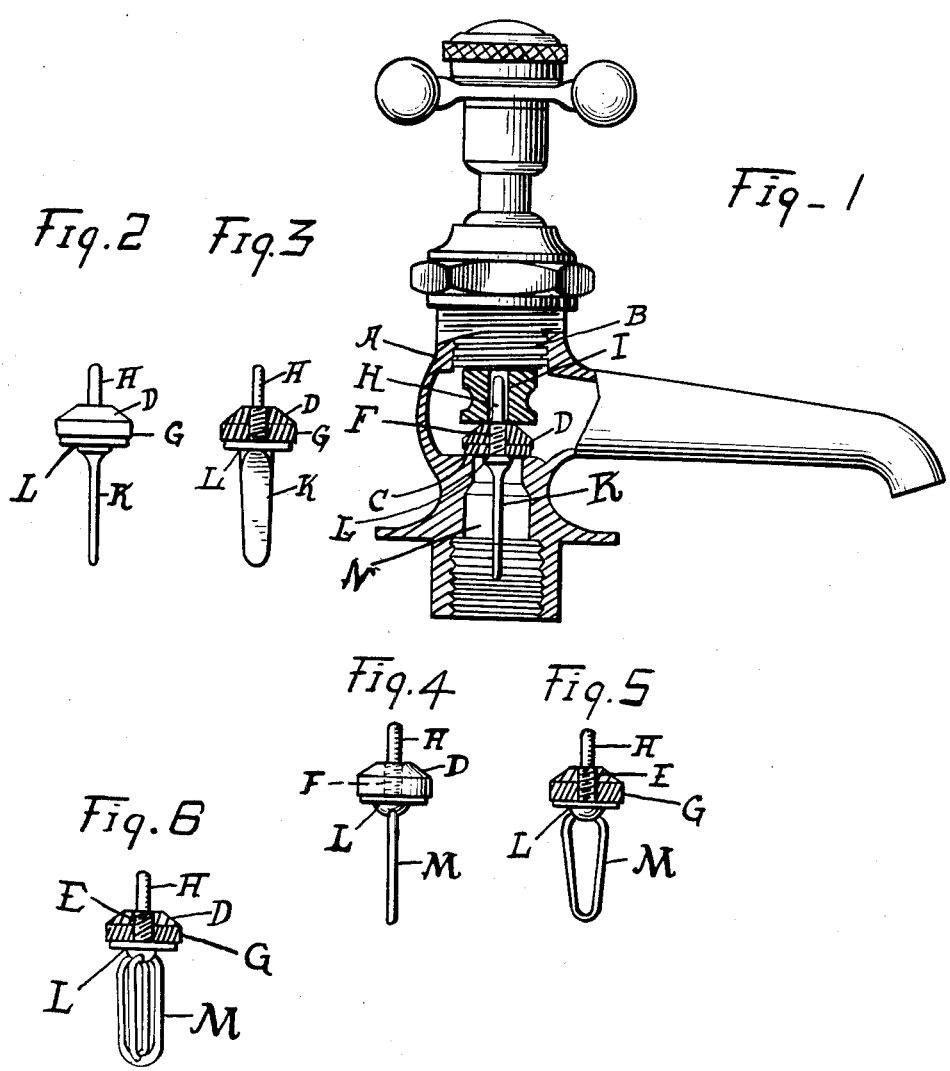

1,953,675

UNITED STATES PATENT OFFICE 1,953,675

FLOATING WASHER FOR WATER FAUCETS

Jakob Erisman, Cleveland, Ohio

Application June 23, 1933, Serial No. 678,380

1 Claim. (Cl. 251—139)

The invention has for its objects, the provision of means for preventing friction between the valve in a hot or cold water faucet and its seat, thus causing the valve to operate freely at all times without wearing the washer.

The invention is also designed to provide a perfect alinement of the valve with its seat so that it will automatically close with and lift from the seat and when seated will engage with the seat without rotation of the washer thereon.

In this manner there can be no irregularity of wear upon the washer or seat, and the life of the washer will be greatly prolonged and the cost of replacing washers will be reduced.

Also there will be no danger of leakage from the valve.

To accomplish these and other useful results, the invention comprises a floating valve intermediate of the screw threaded valve stem and the valve seat, and means for providing free vertical movement of the valve towards and from its seat when the valve stem is raised, as hereinafter more fully described, illustrated in the accompanying drawing and particularly pointed out in the claim.

In the accompanying drawing Figure 1 is a vertical central section of the device; Figures 2 and 3 are edge and side elevations respectively thereof; Figures 4, 5 and 6 are similar views of a modified form of construction thereof.

In these views A, represents the faucet; B, is the screw threaded valve stem; C, is the valve seat and D, the floating valve.

The valve D, is provided with a screw threaded central opening E, and a guide stem F, also threaded is secured therein. A rubber washer G, is sleeved over this guide stem and the upper part H, of this guide stem is reduced in diameter and is insertable in a central opening I, in the inner end of the outer valve stem B.

This opening may be the threaded opening formed in the ordinary faucet in which the screw that screws the rubber washer thereto is inserted.

The external extremity H, of the guide stem is smooth and plays freely in the opening I, so that no irregularity in the alinement of the valve seat and external stem B, can affect the bearing of the valve on its seat.

The lower extremity of the guide stem F, is provided with a guiding and stabilizing blade K, which is inserted in the opening in the valve seat and prevents the valve from tipping so it can never be prevented from securing an accurate seat.

The washer is clamped between the metal valve disc and a shoulder L, upon the guide stem so the washer can never become loose or be displaced.

This, however, does not prevent the washer from being readily replaced when worn out.

In Figures 4 and 5 and 6 a wire loop M, is shown in lieu of a blade.

These have the advantages that they occupy less room in the water passage than the blade and permit the unobstructed flow of water therethrough.

The advantages of this device are obvious in that the valve and its washer are independent of the movements of the external valve stem and do not revolve therewith when turning off the water, thence the washer is long lived and always in perfect alignment with its seat.

Having described the invention what I claim and desire to secure by Letters Patent is.

In a faucet, a passaged body and valve seat therein, a screw threaded valve stem therein, said stem having an opening in its lower end, and an independent valve and washer therefor, a guide steam threaded upon said valve and having a lateral shoulder on which said washer is compressed by said valve, said stem extending upwardly into the opening in said external stem and a wire loop attached to said guide stem and extending into the passage beneath said valve.

JAKOB ERISMAN.